(12) United States Patent
Saito

(10) Patent No.: US 8,204,550 B2
(45) Date of Patent: Jun. 19, 2012

(54) IN-VEHICLE HANDSFREE APPARATUS

(75) Inventor: Soichi Saito, Obu (JP)

(73) Assignee: Denso Corporation, Kariya (JP)

( * ) Notice: Subject to any disclaimer, the term of this patent is extended or adjusted under 35 U.S.C. 154(b) by 568 days.

(21) Appl. No.: 12/384,308

(22) Filed: Apr. 2, 2009

(65) Prior Publication Data

US 2009/0253467 A1  Oct. 8, 2009

(30) Foreign Application Priority Data

Apr. 4, 2008 (JP) ................................. 2008-098241

(51) Int. Cl.
*H04M 1/00* (2006.01)
(52) U.S. Cl. .................... 455/569.2; 455/41.3; 455/345
(58) Field of Classification Search .............. 455/569.1, 455/569.2, 345, 41.2, 41.3
See application file for complete search history.

(56) References Cited

U.S. PATENT DOCUMENTS

| | | | |
|---|---|---|---|
| 7,873,392 B2 * | 1/2011 | Matsuda | 455/569.2 |
| 2002/0032048 A1 | 3/2002 | Kitao et al. | |
| 2002/0103622 A1 * | 8/2002 | Burge | 702/183 |
| 2004/0151285 A1 * | 8/2004 | Sychta | 379/88.16 |
| 2007/0178838 A1 | 8/2007 | Matsuda | |
| 2007/0178944 A1 | 8/2007 | Mitsuru et al. | |
| 2008/0051156 A1 | 2/2008 | Matsuda | |
| 2009/0253466 A1 | 10/2009 | Saito et al. | |
| 2010/0015919 A1 * | 1/2010 | Tian | 455/41.2 |

FOREIGN PATENT DOCUMENTS

| | | |
|---|---|---|
| JP | 2002-193046 | 7/2002 |
| JP | 2007-208697 | 8/2007 |
| JP | 2008-053805 | 3/2008 |

OTHER PUBLICATIONS

Office action dated Jun. 22, 2011 in corresponding Chinese Application No. 200910132951.3.

* cited by examiner

*Primary Examiner* — James H Cho
(74) *Attorney, Agent, or Firm* — Harness, Dickey & Pierce, PLC

(57) ABSTRACT

While an in-vehicle handsfree apparatus establishes a connection of a handsfree profile (HFP) with a first cellular phone, an audio visual profile (AVP) connection with a second cellular phone is requested. In such a case, the handsfree apparatus once cuts the HFP connection with the first cellular phone, and then connects the AVP with the second cellular phone. This can prevent the handsfree apparatus from connecting the HFP with the first and second cellular phones at the same time.

2 Claims, 2 Drawing Sheets

IN-VEHICLE HANDSFREE APPARATUS

CROSS REFERENCE TO RELATED APPLICATION

This application is based on and incorporates herein by reference Japanese Patent Application No. 2008-98241 filed on Apr. 4, 2008.

FIELD OF THE INVENTION

The present invention relates to an in-vehicle handsfree apparatus which can connect a handsfree communication protocol simultaneously with multiple cellular phones compliant with a handsfree communication protocol for executing a handsfree communication.

BACKGROUND OF THE INVENTION

Patent Document 1: JP 2002-193046 A (corresponding to US2002/0032048)

Patent document 1 describes a technology to connect a Bluetooth (trade marks, referred to as "BT") communication link to thereby transmit data registered in a cellular phone to an in-vehicle handsfree apparatus.

The BT communication standard includes profiles such as a handsfree profile (HFP) for executing a handsfree communication using a cellular phone and an audio visual profile (AVP) for executing a music data transfer. Incidentally, in recent years, an in-vehicle handsfree apparatus is required which has a function (referred to as a function for multi-profile connection) to connect a handsfree profile with each of multiple cellular phones at the same time.

When such an in-vehicle handsfree apparatus having a function of a multi-profile connection is realized, the following case may arise. While an in-vehicle handsfree apparatus connects a handsfree profile (HFP) with a first cellular phone, an audio visual profile (AVP) connection with a second cellular phone is requested and the AVP is connected with the second cellular phone. When generating the connection request of the AVP, a certain type of a cellular phone also issues a connection request of the HFP according to the specification thereof. Thus, the handsfree apparatus dare to connect the HFP with both the first and second cellular phones. Herein, there is a possibility that the first cellular phone and the second cellular phone receive incoming call signals. If the first cellular phone and the second cellular phone receive incoming call signals simultaneously, a call control to the incoming call signals simultaneous occurring cannot be performed.

To anticipate the above case, when an audio visual profile (AVP) connection with a second cellular phone is requested while a handsfree profile (HFP) is connected with a first cellular phone, it may be assumed that the handsfree apparatus permits the connection request of the AVP while refusing the connection request of the HFP even if it is issued. However, a certain type of a cellular phone has the specification which cannot cut the AVP connected with the second cellular phone if the connection request of the HFP is refused. The connection request of the HFP from the second cellular phone cannot be thus refused.

SUMMARY OF THE INVENTION

The present invention is made in view of the above situation. It is an object to provide an in-vehicle handsfree apparatus, which can increase usability, as follows. When a handsfree apparatus connects a handsfree profile with a first cellular phone, an audio visual profile connection with a second cellular phone may be requested. In such a case, the handsfree apparatus performs a data transfer from the second cellular phone appropriately without interfering with a call control.

According to an example of the present invention, an in-vehicle handsfree apparatus is provided as follows. A handsfree protocol connecting section is configured to connect a handsfree communication protocol with a cellular phone compliant with a handsfree communication protocol for executing a handsfree communication using the cellular phone. A data transfer protocol connecting section is configured to connect a data transfer protocol with a cellular phone compliant with a data transfer protocol for executing a data transfer from the cellular phone. A control section is configured, in case that a connection request of a data transfer protocol with a second cellular phone among a plurality of cellular phones occurs when a handsfree communication protocol is connected with a first cellular phone among the plurality of cellular phones, to once disconnect the handsfree communication protocol which has been connected with the first cellular phone and then connect a data transfer protocol with the second cellular phone using the data transfer protocol connecting section.

According to an example of the present invention, a method is provided for performing a data transfer in an in-vehicle handsfree apparatus capable of connecting a handsfree communication protocol simultaneously with a first cellular phone and a second cellular phone. The method comprises: connecting a handsfree communication protocol with the first cellular phone for executing a handsfree communication; receiving a connection request of a data transfer protocol from the second cellular phone, which occurs in response to a user operation to instruct the second cellular phone to perform a data transfer to the in-vehicle handsfree apparatus; disconnecting the handsfree communication protocol with the first cellular phone; and connecting the data transfer protocol with the second cellular phone.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
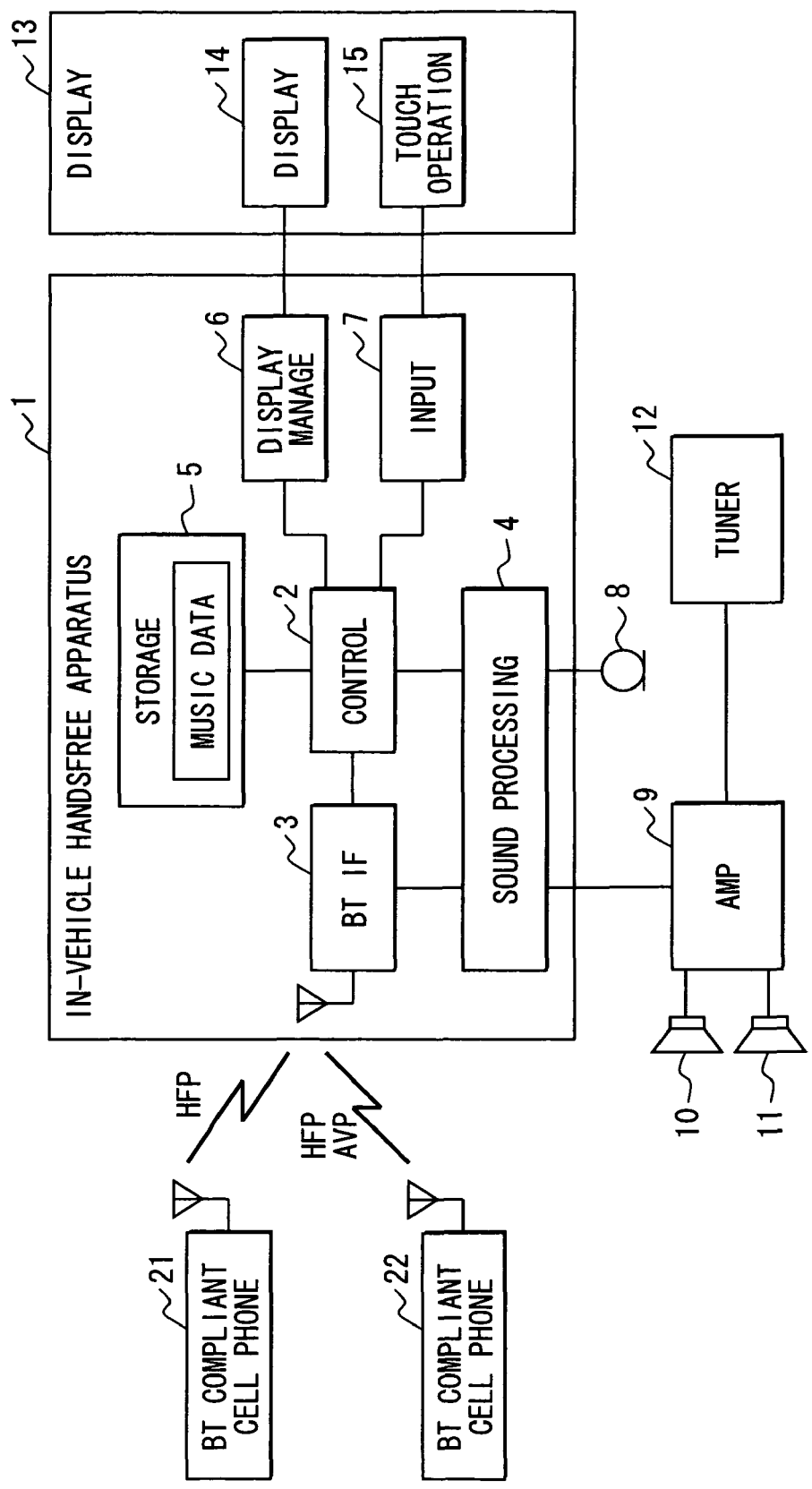
FIG. 1 is a functional block diagram of an overall configuration of an in-vehicle handsfree apparatus according to an embodiment of the present invention.

An embodiment according to the present invention will be explained with reference to drawings. An in-vehicle handsfree apparatus 1 is mounted in a subject vehicle. The in-vehicle handsfree apparatus 1 includes a control section 2, a Bluetooth interface section 3, a call sound processing section 4, a storage section 5, a display management section 6, and an input section 7. Herein, Bluetooth is a registered trademark and referred to as BT hereinafter. The BT interface section 3 may function as an example of a handsfree protocol connecting means or section, or a data transfer protocol connecting means or section.

The control section 2 includes a CPU, RAM, ROM, I/O bus, etc., and controls an overall operation of the in-vehicle handsfree apparatus 1 such as a communication operation, a data control operation, etc. The BT interface section 3 responds to several profiles specified in the BT communication standard. Such profiles include a handsfree profile (HFP) for performing a handsfree communication, an audio visual profile (AVP) for performing a music data transfer, a phone book access profile (PBAP) for transmitting telephone book data, and an object push profile (OPP). The above-mentioned HFP is equivalent to a handsfree communications protocol while the AVP is equivalent to a data transfer protocol. Herein, the above profiles signify communication protocols defined for every function.

The call sound processing section 4 is connected with a microphone 8 and an audio amplifier 9. The microphone 8 is arranged at a position to easily collect user's utterance, for instance, at a vicinity of a steering wheel in the passenger compartment. The audio amplifier 9 is arranged outside of the in-vehicle handsfree apparatus 1. Suppose that a first cellular phone 21 and a second cellular phone 22 are brought into the vehicle. Both cellular phones 21, 22 have a BT communication function (referred to as BT compliant). In this case, the call sound processing section 4 performs a handsfree communication as follows. When a sound uttered by a user is inputted as a transmit voice via the microphone 8, the inputted transmit voice is sound processed and outputted to the BT interface section 3. When receiving a reception sound via the BT interface section 3, the call sound processing section 4 outputs the received reception sound to the audio amplifier 9. When the audio amplifier 9 receives the reception sound from the call sound processing section 4, the audio amplifier 9 amplifies the reception sound and outputs the amplified sound via the speakers 10, 11.

The speakers 10, 11 are arranged symmetrically in the passenger compartment of the vehicle. For example, the speaker 10 is arranged at the driver's seat door, while the speaker 11 is arranged at the front passenger door. In addition, the audio amplifier 9 is also connected to a tuner deck 12. For instance, the tuner deck 12 receives a musical tune sound from a storage medium for music, or a radio program from a radio station and outputs them to the audio amplifier 9. The audio amplifier 9 amplifies the received musical tune sound and the radio program and outputs the amplified sounds via the speakers 10, 11.

The storage section 5 stores various data including music data, which is transmitted from the cellular phone 21, 22 with which the in-vehicle handsfree apparatus 1 connects the AVP. The storage section 5 further stores the following data: phonebook data indicating correspondence between telephone numbers and registration names; historical outgoing call data indicating correspondence between outgoing call clock times and destination phone numbers with respect to outgoing calls from the in-vehicle handsfree apparatus 1 or cellular phones 21, 22 with which the HFP is connected; historical incoming call data indicating correspondence between incoming call clock times and source phone numbers with respect to incoming calls to the in-vehicle handsfree apparatus 1 or cellular phones 21, 22 with which the HFP is connected; and historical missed incoming call data indicating correspondence between incoming call clock times and source phone numbers with respect to missed incoming calls to the in-vehicle handsfree apparatus 1 or cellular phones 21, 22 with which the HFP is connected.

The display apparatus 13 includes a display section 14 for displaying display windows, and a touch operation section 15 forming a touch switch on the display window. The display management section 6 controls a display operation of the display section 14 in the display apparatus 13 based on a display command signal, which is received from the control section 2. The input section 7 receives an operation detection signal via the touch operation section 15 according to the user having operated the touch switch currently formed on the display window. The input section 7 outputs the received operation detection signal to the control section 2. The control section 2 processes the received operation detection signal by analyzing it.

The first and second cellular phones 21, 22 are compliant with the HFP for performing a handsfree communication and the AVP for performing a data transfer. The HFP and AVP are specified in the BT communication standard.

An operation under the above configuration is explained with reference to FIG. 2. Herein, it is assumed that the in-vehicle handsfree apparatus 1 can connect the HFP with the first cellular phone 21 and the second cellular phone 22 at the same time (i.e., multi-profile connection is possible). Further, it is assumed when the HFP is connected between the first cellular phone 21 and the in-vehicle handsfree apparatus 1, a user operates the second cellular phone 22 to thereby generate a connection request of the AVP between the second cellular phone 22 and the in-vehicle handsfree apparatus 1.

Figure 2:
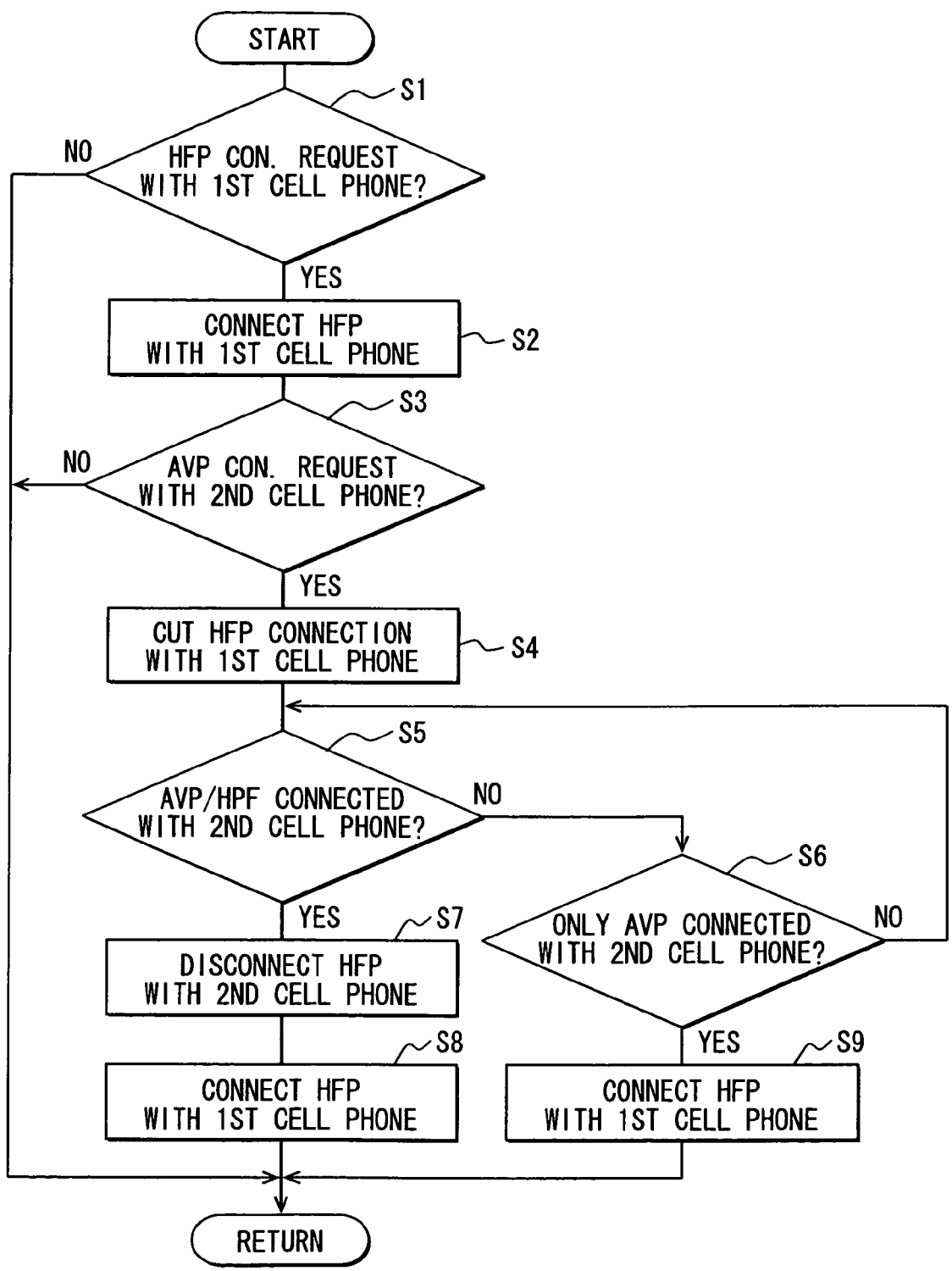
FIG. 2 is a flowchart of a process by a control section of the in-vehicle handsfree apparatus.

As illustrated in FIG. 2, in the in-vehicle handsfree apparatus 1, the control section 2 determines at S1 whether the cellular phone 21 exists in the BT communication range of the in-vehicle handsfree apparatus 1 and a connection request of the HFP with the first cellular phone 21 occurs. When the determination at S1 is affirmed, the HFP is connected with the first cellular phone 21 by the BT interface section 3 at S2. It is determined at S3 whether a connection request of the AVP with the second cellular phone 22 occurs.

When the control section 2 determines that the connection request of the AVP occurs between the second cellular phone 22 and the in-vehicle handsfree apparatus 1 by the user having operated the second cellular phone 22, corresponding to YES at S3, the HFP, which has been connected with the first cellular phones 21 is once disconnected or cut at S4. The control section 2 determines whether both the AVP and HFP are connected with the second cellular phone 22, or whether only the AVP is connected with the second cellular phone 22 at S5 or S6, respectively.

When the second cellular phone 22 having generated the connection request of the AVP is a type that requests the connection of the HFP in conjunction with the generation of the connection request of the AVP, the control section 2 affirmatively determines at S5 that both the AVP and HFP are connected with the second cellular phone 22. Thereby, the HFP, which has been connected with the second cellular phone 22 is disconnected or cut at S7. In contrast, the HFP, which is disconnected with the first cellular phone 21 is connected again at S8. In contrast, when the second cellular phone 22 having generated the connection request of the AVP is a type that requests only the connection of the AVP, the control section 2 affirmatively determines at S6 that only the AVP is connected with the second cellular phone 22. Thereby, the HFP disconnected with the first cellular phone 21 is connected again at S9.

According to the in-vehicle handsfree apparatus 1 of the present embodiment, when the connection request of the AVP with the second cellular phone 22 is generated during connecting the HFP with the first cellular phone 21, the handsfree apparatus 1 once cuts the HFP connection with the first cellular phone 21, and then connects the AVP with the second cellular phone 22. This can prevent the handsfree apparatus 1 from simultaneously connecting the HFP with the first and second cellular phones 21, 22. Without interfering with the call control, music data can be appropriately transmitted from the second cellular phone 22, thereby increasing usability.

Moreover, it is configured that the re-connection of the HFP with the first cellular phone 21 is performed after connecting the AVP with the second cellular phone 22. Thus, while continuing the connection of the AVP with the second cellular phone 22, the state of the first cellular phone 21 is returned to the state taking place before the connection request of the AVP with the second cellular phone 22 occurs. Moreover, even if the HFP is also connected with the second cellular phone 22 in conjunction with connecting the AVP with the second cellular phone 22, the connection state relative to the first cellular phone 21 can be returned to the state having taken place before the connection request of the AVP from the second cellular phone 22 occurred while connecting the AVP with the second cellular phone 22 by once disconnecting the HFP having been connected with the first cellular phone 21.

The present invention is not limited only to the above-mentioned embodiment, and can be modified or extended as follows. The in-vehicle handsfree apparatus may be replaced by an in-vehicle navigation apparatus having a handsfree function. The AVP may be replaced by another profile.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

As an aspect of the disclosure, an in-vehicle handsfree apparatus is provided as follows. A handsfree protocol connecting section is configured to connect a handsfree communication protocol with a cellular phone compliant with a handsfree communication protocol for executing a handsfree communication using the cellular phone. A data transfer protocol connecting section is configured to connect a data transfer protocol with a cellular phone compliant with a data transfer protocol for executing a data transfer from the cellular phone. A control section is configured, in case that a connection request of a data transfer protocol with a second cellular phone occurs when a handsfree communication protocol is connected with a first cellular phone, to once disconnect the handsfree communication protocol which has been connected with the first cellular phone and then connect a data transfer protocol with the second cellular phone using the data transfer protocol connecting section.

The above configuration can prevent concurrent connections of the HFP with both the first and second cellular phones. Without interfering with the call control, the data transfer from the second cellular phone can be appropriately performed, thus increasing usability.

As an optional aspect, the control section may be further configured, after having connected the data transfer protocol with the second cellular phone using the data-transfer protocol connecting section, to connect again the handsfree communication protocol with the first cellular phone using the handsfree protocol connecting section.

Thereby, while continuing the data transfer protocol with the second cellular phone, the handsfree apparatus can return the connection state of the first cellular phone to the state having taken place before the connection request of the data transfer protocol from the second cellular phone has occurred.

As a further optional aspect, the control section may be further configured, when the handsfree communication protocol is connected with the second cellular phone by the handsfree protocol connecting section in conjunction with connecting the data transfer protocol with the second cellular phone by the data transfer protocol connecting section, to connect again the handsfree communication protocol with the first cellular phone using the handsfree protocol connecting section after having disconnected the handsfree communication protocol, which has been connected with the second cellular phone.

Thus, by disconnecting or cutting the handsfree communication protocol with the second cellular phone, the following situation similarly takes place. That is, while continuing the data transfer protocol with the second cellular phone, the handsfree apparatus can return the connection state of the first cellular phone to the state having taken place before the connection request of the data transfer protocol with the second cellular phone has occurred.

It will be obvious to those skilled in the art that various changes may be made in the above-described embodiments of the present invention. However, the scope of the present invention should be determined by the following claims.

What is claimed is:

1. An in-vehicle handsfree apparatus comprising:
a handsfree protocol connecting section configured to connect a handsfree communication protocol with a cellular phone compliant with a handsfree communication protocol for executing a handsfree communication using the cellular phone;
a data transfer protocol connecting section configured to connect a data transfer protocol with a cellular phone compliant with a data transfer protocol for executing a data transfer from the cellular phone; and
a control section configured,
in case that a connection request of a data transfer protocol with a second cellular phone among a plurality of cellular phones occurs when a handsfree communication protocol is connected with a first cellular phone among the plurality of cellular phones different than the first cellular phone,
to disconnect the handsfree communication protocol which has been connected with the first cellular phone and then connect a data transfer protocol with the second cellular phone using the data transfer protocol connecting section;
the control section being further configured,
when the handsfree communication protocol is connected with the second cellular phone by the handsfree protocol connecting section in conjunction with connecting the data transfer protocol with the second cellular phone by the data transfer protocol connecting section,
to connect only the handsfree communication protocol with the first cellular phone using the handsfree protocol connecting section after having disconnected only the handsfree communication protocol, which has been connected with the second cellular phone and maintaining the connection of the data transfer protocol with the second cellular phone.

2. A method for performing a data transfer in an in-vehicle handsfree apparatus capable of connecting a handsfree communication protocol simultaneously with a first cellular phone and a second cellular phone different than the first cellular phone, the method comprising:

connecting a handsfree communication protocol with the first cellular phone for executing a handsfree communication;

receiving a connection request of a data transfer protocol from the second cellular phone, which occurs in response to a user operation to instruct the second cellular phone to perform a data transfer to the in-vehicle handsfree apparatus;

disconnecting the handsfree communication protocol with the first cellular phone; and connecting the data transfer protocol with the second cellular phone; wherein when the handsfree communication protocol is connected with the second cellular phone in conjunction with connecting the data transfer protocol with the second cellular phone, only the handsfree communication protocol is connected with the first cellular phone after having disconnected only the handsfree communication protocol, which has been connected with the second cellular phone and the connection of the data transfer protocol with the second cellular phone is maintained.

\* \* \* \* \*